(12) United States Patent
Balke et al.

(10) Patent No.: US 12,377,720 B2
(45) Date of Patent: Aug. 5, 2025

(54) BODYSHELL STRUCTURE FOR AN ELECTRICALLY DRIVEABLE MOTOR VEHICLE

(71) Applicant: Mercedes-Benz Group AG, Stuttgart (DE)

(72) Inventors: Clemens Balke, Esslingen (DE); Thorsten Haefner, Nuertingen (DE); Anja Talke, Kirchheim Teck (DE)

(73) Assignee: Mercedes-Benz Group AG, Stuttgart (DE)

( * ) Notice: Subject to any disclaimer, the term of this patent is extended or adjusted under 35 U.S.C. 154(b) by 496 days.

(21) Appl. No.: 17/910,609

(22) PCT Filed: Feb. 24, 2021

(86) PCT No.: PCT/EP2021/054479
§ 371 (c)(1),
(2) Date: Sep. 9, 2022

(87) PCT Pub. No.: WO2021/180469
PCT Pub. Date: Sep. 16, 2021

(65) Prior Publication Data
US 2023/0140500 A1    May 4, 2023

(30) Foreign Application Priority Data
Mar. 9, 2020    (DE) ............... 10 2020 001 540.9

(51) Int. Cl.
*B01D 53/02*    (2006.01)
*B01D 45/08*    (2006.01)
(Continued)

(52) U.S. Cl.
CPC ............... *B60K 1/04* (2013.01); *B01D 45/08* (2013.01); *B01D 46/2411* (2013.01);
(Continued)

(58) Field of Classification Search
CPC .... B01D 45/08; B01D 46/2411; B01D 47/06; B60K 1/04; B60K 13/06; B60K 2001/005;
(Continued)

(56) References Cited

U.S. PATENT DOCUMENTS 8,029,343 B2    10/2011    Major et al.
11,283,121 B1 *    3/2022    Boecker .............. H01M 50/249
(Continued)

FOREIGN PATENT DOCUMENTS

CN    109103391 A    12/2018
CN    209312845 U    8/2019
(Continued)

OTHER PUBLICATIONS

PCT/EP2021/054479, International Search Report dated May 26, 2021 (Two (2) pages).
(Continued)

*Primary Examiner* — Christopher P Jones
(74) *Attorney, Agent, or Firm* — Crowell & Moring LLP

(57) ABSTRACT

A bodyshell structure for an electrically driveable motor vehicle includes a ventilation channel formed by a plurality of structural components that are connected to one another and delimit respective cavities. The ventilation channel has at least one inlet opening for inflow of a venting gas that emerges from a drive battery of the motor vehicle in an event of a thermal event and has at least one outlet opening via which the venting gas is dischargeable into a surrounding of the motor vehicle. A venting gas treatment device is disposed inside the ventilation channel where the venting gas and/or particles entrained with the venting gas is treatable by the venting gas treatment device.

9 Claims, 5 Drawing Sheets

(51) Int. Cl.
  *B01D 46/24* (2006.01)
  *B01D 47/06* (2006.01)
  *B60K 1/04* (2019.01)
  *B60L 58/26* (2019.01)
  *B62D 25/20* (2006.01)
  *H01M 50/358* (2021.01)
  *B60K 1/00* (2006.01)

(52) U.S. Cl.
  CPC .............. *B01D 47/06* (2013.01); *B60L 58/26* (2019.02); *B62D 25/20* (2013.01); *H01M 50/358* (2021.01); *B60K 2001/005* (2013.01); *B60K 2001/0438* (2013.01); *H01M 2220/20* (2013.01)

(58) Field of Classification Search
  CPC ............ B60K 2001/0438; B60L 58/26; B60Y 2306/05; B62D 25/20; H01M 2220/20; H01M 50/204; H01M 50/249; H01M 50/358; Y02E 60/10; Y02T 10/70
  See application file for complete search history.

(56) References Cited

U.S. PATENT DOCUMENTS

| | | | |
|---|---|---|---|
| 12,162,342 B2* | 12/2024 | Balke | H01M 50/249 |
| 2009/0120620 A1 | 5/2009 | Abe et al. | |
| 2010/0009244 A1 | 1/2010 | Murata | |
| 2012/0237803 A1 | 9/2012 | Mardall et al. | |
| 2014/0127539 A1 | 5/2014 | Helber | |
| 2014/0193683 A1* | 7/2014 | Mardall | B60K 1/04 |
| | | | 429/99 |
| 2016/0218336 A1* | 7/2016 | Herrmann | H01M 50/367 |
| 2020/0350531 A1* | 11/2020 | Edwards | H01M 10/625 |
| 2021/0159567 A1* | 5/2021 | Pires | H01M 50/242 |
| 2022/0169125 A1* | 6/2022 | Borghi | B60L 3/0046 |

FOREIGN PATENT DOCUMENTS

| | | |
|---|---|---|
| DE | 10 2008 049 490 A1 | 5/2009 |
| DE | 10 2010 005 367 A1 | 7/2011 |
| DE | 10 2013 204 585 A1 | 9/2014 |
| DE | 10 2014 001 975 A1 | 8/2015 |
| DE | 10 2017 000 266 A1 | 7/2017 |
| DE | 10 2016 116 457 A1 | 3/2018 |
| EP | 503 264 A1 | 9/1992 |
| EP | 2 199 133 B1 | 6/2010 |
| EP | 2 704 915 B1 | 3/2014 |
| WO | WO 2020/013120 A1 | 1/2020 |

OTHER PUBLICATIONS

German-language German Office Action issued in German application No. 10 2020 001 540.9 dated Dec. 3, 2020 (Six (6) pages).

Chinese-language Office Action issued in Chinese Application No. 202180019802.5 dated Mar. 14, 2025 (8 pages).

* cited by examiner

BODYSHELL STRUCTURE FOR AN ELECTRICALLY DRIVEABLE MOTOR VEHICLE

BACKGROUND AND SUMMARY OF THE INVENTION

The invention relates to a bodyshell structure for an electrically driveable motor vehicle.

The energy storage systems currently used in electrically powered motor vehicles are often based on lithium-ion technology. In today's electrically powered motor vehicles, it is a great challenge when a so-called "thermal propagation", i.e., a thermal event, occurs in such an energy storage device. This occurs, among other things, when a battery cell of the electrical energy storage device becomes too warm due to an internal short circuit and the materials dissolve in an exothermic reaction ("thermal runaway"). The temperature continues to rise, and the cell can open and cause a fire in the electrical energy storage device. The heat generated is transferred to other battery cells of the electrical energy storage device, such that one overheated cell leads to or contributes to the overheating of other cells of the electrical energy storage device.

Without countermeasures, the energy released is so great that the battery housing of the energy storage device can melt and create a safety risk for the occupants of the electrically powered vehicle. While opening the cell, particles and gases in the electrical energy storage device are also released. The released gas is usually referred to as venting gas, a gas to be vented or exhausted, with which particles are entrained.

This considerable amount of gas must be guided out of the energy storage without posing a danger to the occupants of the motor vehicle or persons in the vicinity of the motor vehicle. For this purpose, the gas, which can be up to 900° hot, must be conducted outside the escape routes. In addition, the gas is highly flammable and fire outside the energy storage tank must be avoided at all costs. The particles that are additionally emitted glow and can thus ignite the gas. This only becomes relevant outside the electrical energy storage unit, as there is not enough oxygen available inside for combustion due to the considerable amounts of gas. If such glowing particles escape into the environment of the motor vehicle, especially in a hybrid vehicle, this can also lead to the ignition of fuel, which is carried for an internal combustion engine, for example, if a corresponding fuel tank is damaged.

In order to discharge appropriate venting gas into the environment of the motor vehicle, a bodyshell structure for an electrically driveable motor vehicle is already known from EP 2 704 915 B1, which comprises a venting channel formed by a plurality of interconnected structural components delimiting respective hollow chambers. The structural components provided are, in particular, respective cross members and longitudinal members or side sills. The venting channel has at least one inlet opening for the inflow of venting gas escaping from a drive battery of the motor vehicle in the event of a thermal event, and an outlet opening through which the venting gas can be discharged into an environment of the motor vehicle.

The object of the present invention is to create a bodyshell structure by means of which further improved protection, in particular of the vehicle occupants, is achieved in the event of a thermal event inside the traction battery.

The bodyshell structure according to the invention for an electrically driveable motor vehicle comprises at least one venting channel formed by a plurality of interconnected structural parts delimiting respective hollow chambers, in particular in the form of longitudinal and transverse beams and side sills, the venting channel having at least one inlet opening for the inflow of venting gas escaping from a drive battery of the motor vehicle, also referred to as a traction battery and which supplies at least one electric motor with energy, in the event of a thermal event, and at least one outlet opening, via which the venting gas can be discharged or is discharged into the environment of the motor vehicle. In order to achieve further improved protection, in particular of the occupants of the motor vehicle, in the event of a thermal event within the traction battery, it is provided in accordance with the invention that the venting gas is discharged into the environment of the motor vehicle, at least one venting gas treatment device is provided within the venting channel formed by the structural components of the bodyshell or bodyshell structure for the targeted treatment of the venting gas and/or the particles entrained with the venting gas from the overheated drive battery or one of its cells or cell modules.

The venting gas treatment device is to be understood in particular as a device by means of which, on the one hand, the temperature of the venting gas or of particles carried along with it is deliberately reduced or cooled and/or particles carried along with the venting gas are deliberately collected, filtered or similarly separated within the treatment device in order to at least largely prevent them from escaping from the ventilation duct into the environment of the motor vehicle. In particular, a combination of the described measures is also conceivable, i.e., both a targeted cooling of the venting gas or the entrained particles on the one hand and a targeted collection, filtering or separation of these particles entrained with the venting gas on the other hand. It should be noted in particular that in the context of the present invention, the term "treatment" is therefore also to be understood as the collection, filtering and separation of the respective particles in or from the venting gas.

Overall, it can be seen that a bodyshell structure has been created in which at least one venting channel is formed by the corresponding bodyshell structural components (cross members, side members, in particular side sills, etc.), by means of which venting gas and possibly entrained particles from the traction battery are targetedly introduced into the bodyshell structure or the venting channel and are guided to a correspondingly safe outlet opening provided in particular in the rear region of the vehicle, wherein the venting gas treatment device according to the invention is provided between the inlet opening and the outlet opening, by means of which the venting gas and/or possibly entrained particles are treated in such a way that they are correspondingly uncritical with regard to ignition or the like at the outlet from the motor vehicle.

In a further design of the invention, it has here been shown to be advantageous if the treatment device is designed to cool the venting gas and the entrained hot particles. It has been shown that the mere reduction of the temperature of the venting gas or the entrained particles already leads to a considerable reduction of the dangers of the venting gas and the particles escaping from the motor vehicle.

A further advantageous embodiment of the invention provides that the treatment device is designed to collect, filter or similarly separate the particles entrained with the venting gas. It has been shown that the particles carried along with the venting gas represent a considerable safety risk, such that their separation from the venting gas leads to a considerable safety advantage.

Furthermore, it has been shown to be advantageous if the treatment device has a contouring or similar labyrinth path for extending the flow path of the venting gas through the venting channel and/or for collecting particles entrained with the venting gas. The labyrinth-like guidance of the gas and the particles through the venting channel thus represents a simple possibility, on the one hand, to cool the gas and the particles through the corresponding barriers and the associated extension of the flow path, and, on the other hand, to collect the particles entrained with the venting gas through the corresponding barriers of the labyrinth and to separate them from the gas flow, so to speak. The extended flow path of the venting gas according to the invention also has the effect that the venting gas is retained in the motor vehicle for a longer period of time after leaving the traction battery or the cell modules before it is blown off into the environment. This contributes in particular to the increased safety of bystanders, who can thus move further away from the vehicle.

A further advantageous embodiment of the invention provides that the treatment device comprises a filter for collecting particles entrained with the venting gas. Such a filter element can not only serve to collect the particles but, due to its structure, can also lead to corresponding turbulence or similar of the venting gas, which contributes to a considerable cooling of the gas.

In a further design of the invention, it has been shown to be advantageous if the treatment device has a pressurization device by means of which the venting gas and/or the particles carried along with it can be pressurized with a medium, in particular with water. Such a pressurization device can, for example, cool the venting gas and the particles extremely quickly and reliably.

In a further design of the invention, a floor assembly of the bodyshell structure has a plurality of cross members which are connected externally to respective side sills and, together with the latter, delimit a respective receiving chamber for at least one battery module of the drive accumulator, wherein respective inlet openings for venting gas are provided in the cross members. In other words, in the event of a thermal event within the respective battery cell or the respective battery module, venting gas is introduced via a corresponding inlet opening of the respective adjacent cross member and from this further to the laterally corresponding side sill, from which the further discharge of the venting gas and any entrained particles can take place.

Alternatively, a floor assembly has been shown to be advantageous in which several cross members are connected on the outside to respective side sills arranged at a distance from one another and with these delimit a respective receiving space for at least one battery module of the drive accumulator, wherein respective inlet openings of the venting gas are provided in the side sills. In this case, it is therefore possible, for example, to first conduct the venting gas from the respective battery module or the respective battery cell into the accommodation space, and from there through an inlet opening into the corresponding side sill. This is an extremely simple design of the venting channel.

A further advantageous embodiment of the invention provides that the cross members are closed in the region of a central channel via respective central channel brackets. Such center channel brackets serve not only to close the respective cross members, but also, for example, to hold the respective media channels and lines.

Finally, it has been shown to be advantageous if a floor assembly of the bodyshell structure has an installation space for an encapsulated region in a front and/or rear region, here of the battery modules of the traction battery. In this encapsulated region, for example, electrical components can be accommodated which should not be exposed to venting gas or entrained particles in the event of a thermal event.

Further advantages, features and details of the invention emerge from the following description of preferred embodiments and from the drawings. The features and combinations of features mentioned above in the description as well as the features and combinations of features mentioned below in the description of the figures and/or shown alone in the figures can be used not only in the respectively specified combination, but also in other combinations or on their own, without leaving the scope of the invention.

DETAILED DESCRIPTION OF THE DRAWINGS

Figure 1:
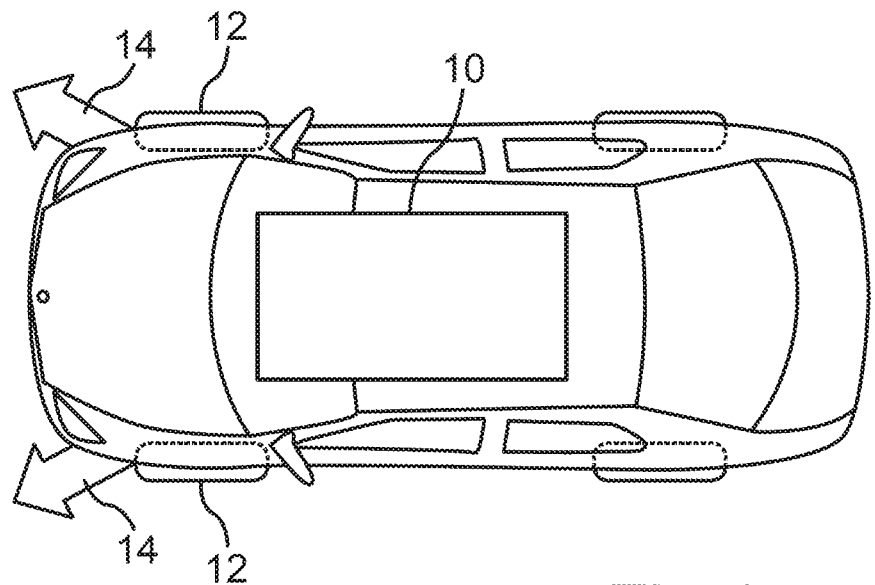
FIG. 1 is a schematic top view of an electrically driveable motor vehicle, wherein preferred outlet openings for venting gas emerging from a drive battery and conducted via a venting channel are indicated.

FIG. 1 shows a schematic top view of an electrically driveable motor vehicle that can be driven, for example, exclusively electrically (BEV—Battery Electric Vehicle) or as a hybrid vehicle (HEV—Hybrid Electric Vehicle) both electrically and with an internal combustion engine. A drive battery 10 can be seen here, which is installed below a floor assembly of a bodyshell structure of the motor vehicle, also in a manner described in more detail below. Usually, such energy storage systems, also referred to as traction batteries, are currently based on lithium-ion technology. With such traction batteries or their battery cells or battery modules, "thermal propagation" or a thermal event or heat transfer can occur. This occurs, among other things, when a battery cell becomes too warm due to an internal short circuit and the materials dissolve in an exothermic reaction ("thermal runaway"). The temperature continues to rise, and the respective battery cell can open and cause a fire within the traction battery. The heat generated is transferred to other cells, such that the one overheated battery cell can contribute to the overheating of other cells, such that the thermal event occurs or becomes even greater. If the respective battery cells or battery modules open, a so-called venting gas and possibly corresponding particles are released. This considerable amount of gas must be guided out of the drive battery or its housing, as otherwise there is a danger for the vehicle occupants. For this purpose, the venting gas, which is up to 900° hot, must be conducted out of the motor vehicle outside the escape routes of the vehicle occupants. In addition, the venting gas is highly flammable and fire outside the traction battery must be avoided at all costs. The particles that are additionally emitted glow and can thus ignite the gas. This flammability of the gas only becomes relevant outside the traction battery, as there is not enough oxygen available for combustion inside the battery housing or compartment due to a considerable amount of venting gas. In the present case, a bodyshell structure is thus provided by means of which, in the event of a thermal event, the escaping venting gas escapes laterally behind the respective rear vehicle wheels 12 from the bodyshell structure or the vehicle in accordance with the arrows 14 in FIG. 1.

Figure 2:
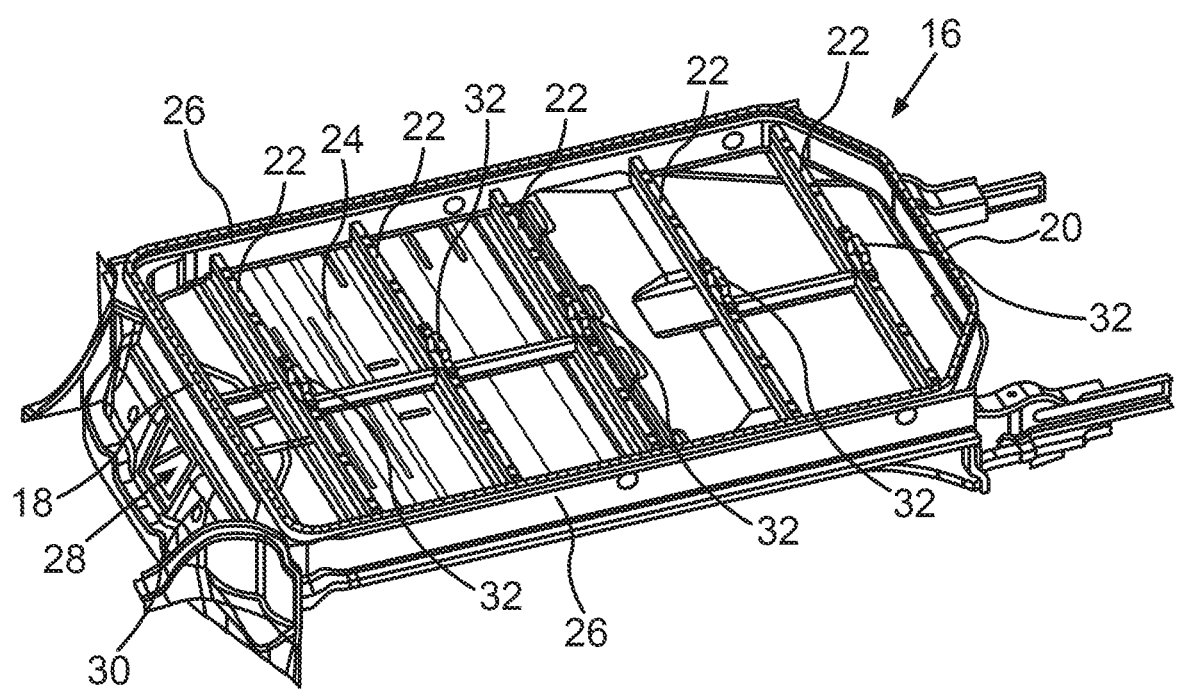
FIG. 2 is a perspective bottom view of a substructure of a bodywork support structure in the floor region underneath a passenger compartment of an electrically driveable motor vehicle according to the invention.

FIG. 2 shows an exemplary embodiment of a bodyshell structure for such an electrically driveable motor vehicle, with the side facing a roadway during driving being viewed from above. In the present case, the bodyshell structure comprises, for example, a floor assembly 16 having five cross members 22 arranged between a front cross member 18 and a rear cross member 20, the cross members extending horizontally and in the transverse direction of the vehicle underneath a vehicle floor 24. On the outside, the respective cross members 18, 20, 22 are connected to a respective laterally associated side sill 26, more precisely its inner part. An outer part, which is not visible here, is attached to the respective inner part of the corresponding side sill 26, whereby the side sills 26 have or delimit respective hollow chambers which are closed on the outer circumference. In addition, the five cross members 22 also each delimit a chamber together with the vehicle floor 24.

A central channel 28 is also visible, which passes through a front end wall 30 and also runs below the respective cross members 22 or is surrounded on the outer periphery by central channel brackets 32, such that media hoses, cables or the like can be laid within or along this central channel 28. In the present case, the respective cross members 22 are each provided with a recess which is closed with the center channel brackets 32 and thus fixes the media hoses, cables, etc. in a fixed position. In addition, a continuous S-stroke can be seen in the area of the front end of the floor assembly 16, which gives it increased robustness in the event of a frontal collision of the motor vehicle with an obstacle with a small width overlap. This S-stroke is a robust transition area from the longitudinal members running in front of the front wall 30 in the front of the vehicle, which are only partially shown in FIG. 2, to the side sills 26, which are further outwards as seen in the transverse direction of the vehicle, so that in particular in the event of a so-called "small-overlap impact" this transition area supports the front wheel that has been displaced backwards and transfers the crash forces into the side sills 26.

When looking at FIG. 2 together with FIGS. 3a and 3b, a first variant of a venting gas guide will now be explained, by means of which, in the event of a corresponding thermal event, venting gas and associated particles can be conducted from the traction battery into the environment of the motor vehicle.

Figure 3A:
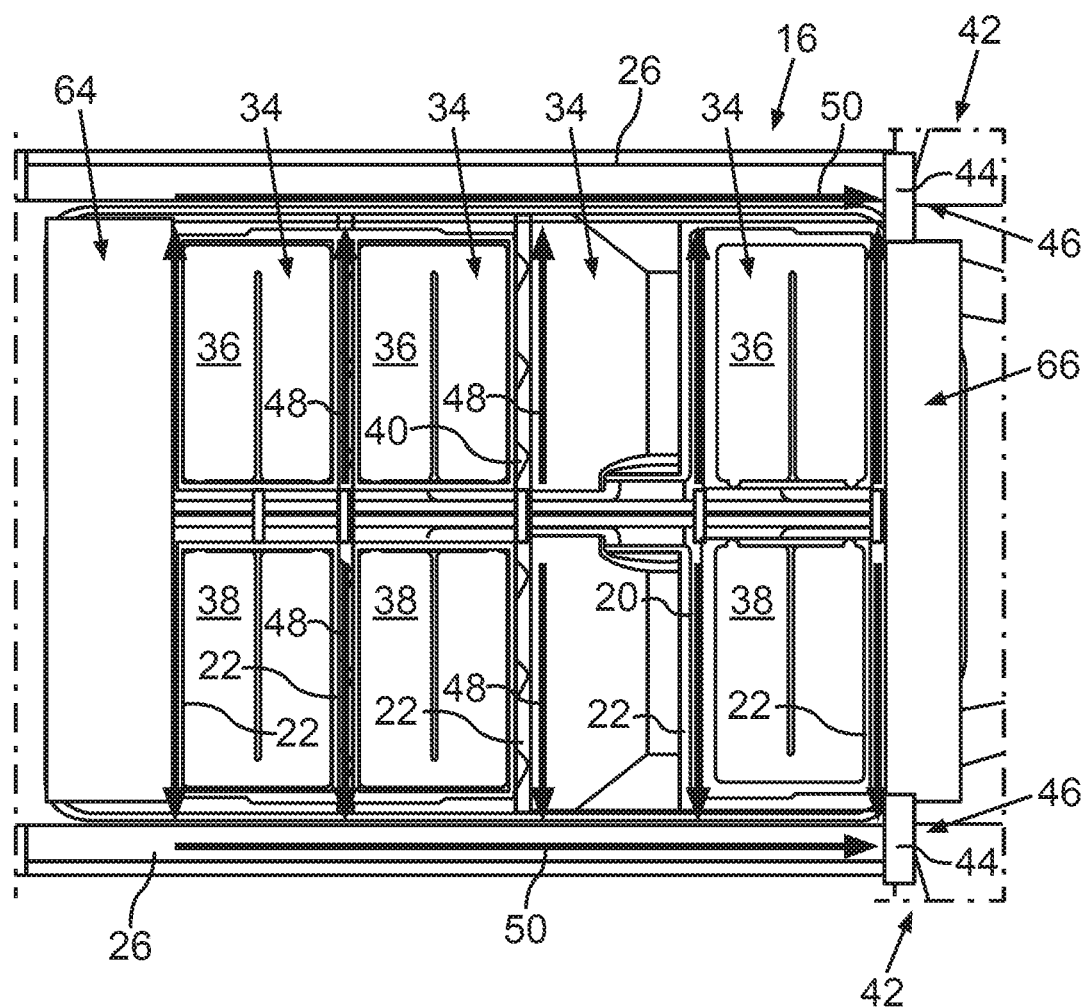
FIGS. 3a, 3b show a bottom view and a cut-out and highly schematic perspective view of the bodyshell structure for an electrically driveable motor vehicle according to a first embodiment, in which a venting gas guide according to a first variant is shown.
Figure 3B:
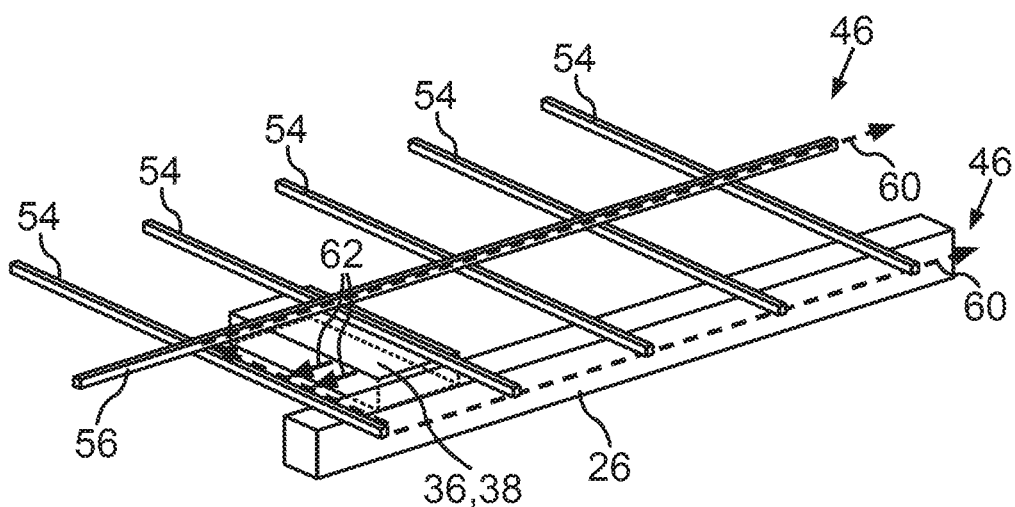

For this purpose, FIG. 3a shows a partial bottom view of the floor assembly 16 according to FIG. 2. It can be seen that the respective cross members 22 and the side sills 26 peripherally delimit a respective receiving space 34, within which respective battery cells or two respective battery modules 36, 38 are arranged per receiving space 34. If a thermal event now occurs within one of these battery cells or battery modules 36, 38, the respective battery modules 36, 38 release a corresponding venting gas and possibly corresponding particles into their respective adjacent cross member 22. The cross members 22 are perforated accordingly for this purpose, preferably offset from one another, such that the respective adjacent battery module 36, 38 or a respective inlet opening 40, via which the venting gas and the particles are introduced into the respective cross member 22, are not mutually exposed to gas. Via the respective cross member 22, which is designed as a hollow chamber profile, the venting gas and the particles reach the respective side sill 26, the shell-shaped inner part of which is perforated in the connection area of the respective cross member 22, such that the venting gas and the particles can enter the respective side sill, which is closed by the inner shell and outer shell as a hollow chamber profile. The venting gas introduced into the respective side sill 26 and the associated particles are then further conducted in the respective hollow chamber of the side sill 26 in the direction of a wheel arch 42 on the rear axle of the motor vehicle. There, a rupture disc 44 is indicated in each case in the area of the rear end of the corresponding side sill 26, which is destroyed accordingly if venting gas or associated particles are present, and the pressure and/or the heat present is correspondingly high. The respective rupture disc 44 closes a respective outlet opening 46 at the end of the side sill 26, via which the gas can be blown off into the environment.

As shown in FIG. 3a by corresponding arrows 48, 50, the respective structural components 22, 26 of the floor assembly 16 in the form of the cross members 22 and the side sills 26 respectively form respective venting channels through which venting gas and associated particles escaping from the respective battery module 36, 38 can be conducted out of the vehicle interior into the open or into the environment of the motor vehicle. In other words, the respective cross members 22 and the side sills 26 form respective venting channels along which the venting gas and the associated particles can be discharged. For this purpose, according to the variant shown in FIG. 3a, the respective cross member 22 has an inlet opening via which venting gas can flow into the corresponding cross member from the battery module 36, 38 or the accommodation space 34, can pass into the cavity of the respective side sill 26 via the openings provided in the respective inner part of the side sill 26 and can then flow out in the direction of the outlet opening 46.

FIG. 3b again shows, in an extremely schematic and perspective view, respective longitudinal or cross members 54, 56 of the floor assembly 16 over which respective receiving spaces for receiving the battery modules 36, 38 are defined. In addition, respective side sills 58, of which only one is shown, adjoin the cross members 56 on the outside. By means of the dashed lines 60, a respective venting channel is shown again, along which venting gas shown with arrows 62 can be discharged through respective structural components of the bodyshell structure designed as hollow chamber profiles. It can be seen here that an additional central venting channel can also be provided in the center of the vehicle, i.e., between the side sills 58.

Figure 4A:
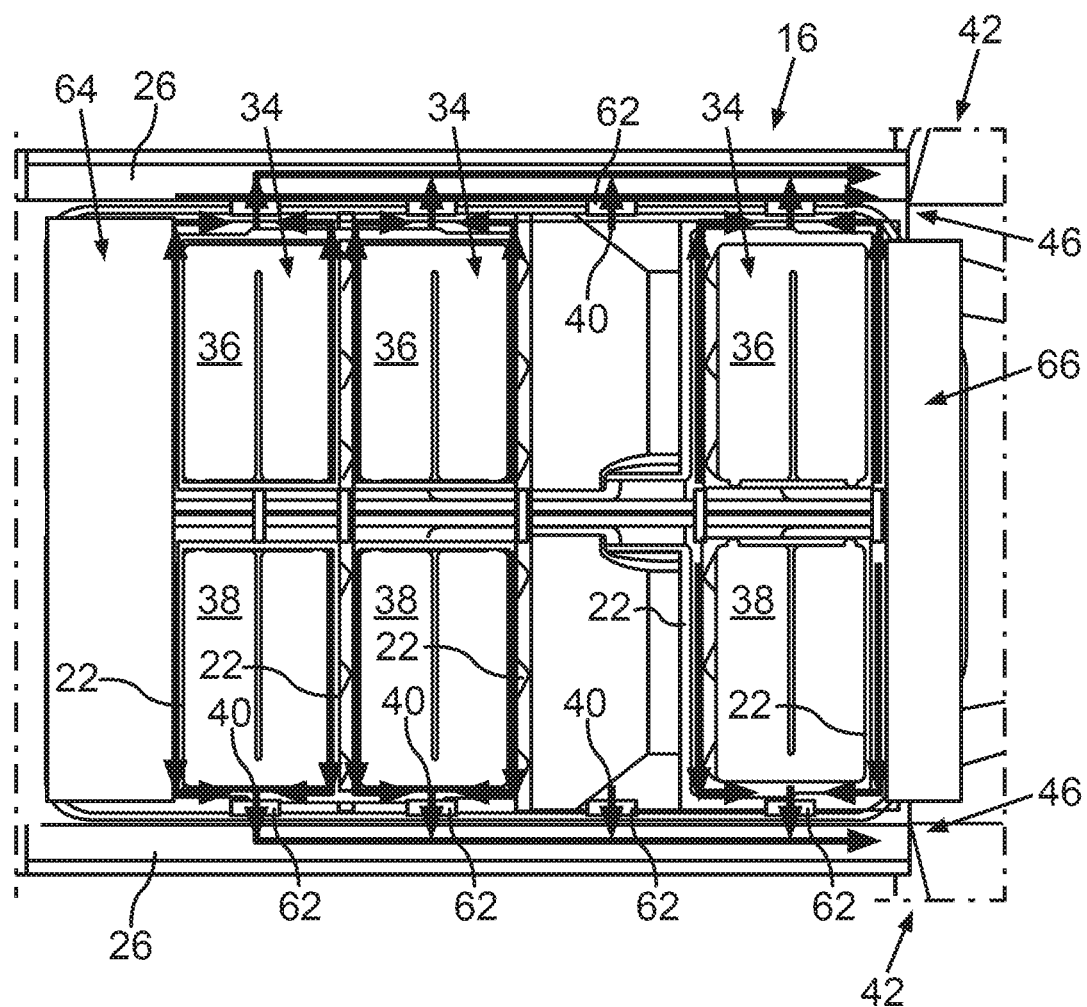
FIGS. 4a, 4b show a bottom view and a schematic depiction of a bodyshell structure for an electrically driveable motor vehicle, in which a venting gas guide according to a second variant is illustrated.

FIG. 4a shows a second variant of the venting gas guide with an otherwise identical base assembly 16 as in FIG. 2. Therefore, only the differences in the embodiment compared to FIG. 3a will be discussed.

In the present exemplary embodiment, it is provided that the battery modules 36, 38 release corresponding venting gas and entrained particles between the respective cross members 22 into the associated receiving space 34 or module chamber, respectively, in the event of a thermal event. Each of these receiving chambers 34 or module chambers has a rupture disc 62 in the area of the inner shell of the respective side sill 26, which is destroyed accordingly when venting gas or particles from the corresponding battery module 36, 38 enter the receiving chamber 34 and from there in the direction of the laterally associated side sill 26. The arrangement of these rupture discs 62 can also be seen in FIG. 2.

Accordingly, in the present exemplary embodiment, the cross members 22 are of continuous design, i.e., without inflow openings 40, as these are located in the region of the respective bursting discs 62. The continuous design of the cross members 22 thus prevents a flashover to neighbouring modules.

Thus, in the present exemplary embodiment, the respective inlet openings 40 are provided above the bursting discs 62 in the region of the side sills 26, through which the venting gas and the corresponding particles pass into the corresponding side sill 26 and from there in turn towards the respective outlet opening 46 at the rear end of the corresponding side sill 26.

Furthermore, it can be seen from FIG. 4a that the ground assembly 16 has a space for a respective encapsulated area in a front and rear area 64, 66 of the battery modules 36, 38 of the traction battery 10. Sensitive electronic components, for example, are arranged in these encapsulated areas.

Figure 4B:
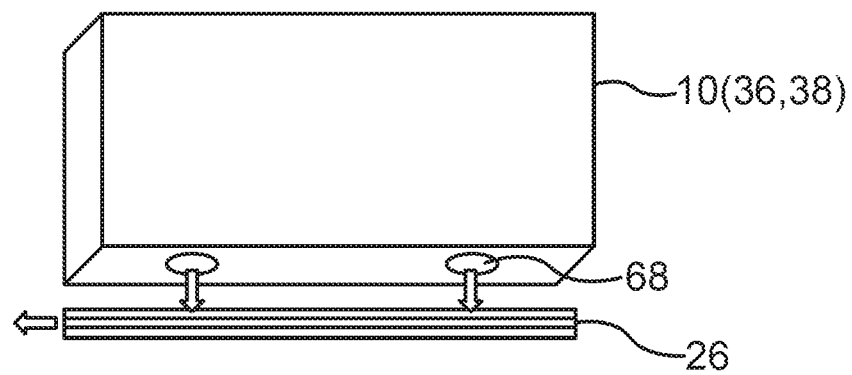

FIG. 4b again shows, in an extremely schematic depiction, this variant of the venting gas guide, in which gas escaping from the respective battery cell 36, 38 first escapes via a bursting element 68 of the respective module housing and then passes via possibly a further bursting element into the interior of the respective laterally associated side sill 26, from where the venting gas and possibly the associated particles are removed.

In order to increase the safety of the vehicle in the event of a thermal event, at least one venting gas treatment device 70 is provided within the respective structural components (cross member, side member, side sill), as explained in more detail in connection with FIG. 5a, for example.

Figure 5A:
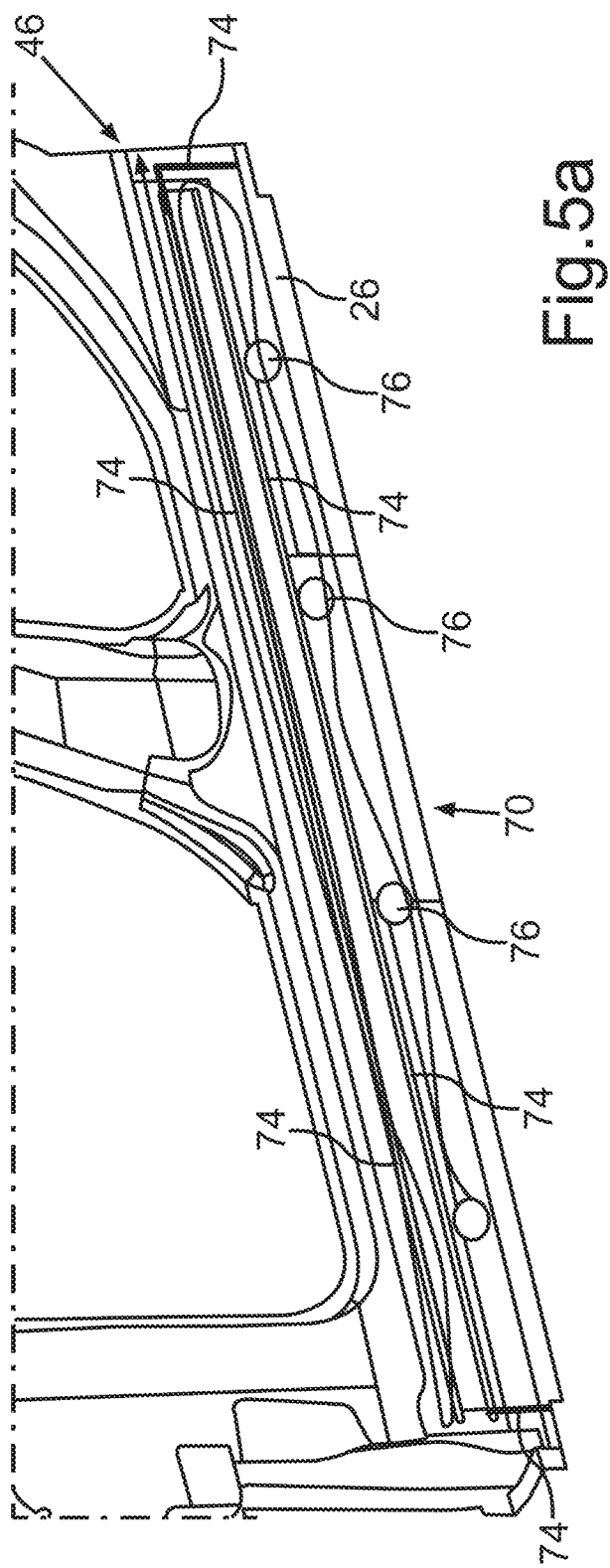
FIGS. 5a, 5b show a partial perspective view and a schematic view of respective structural components of the bodyshell structure which form a venting channel for venting gas and entrained particles and within which a venting gas treatment device in the form of a contouring or similar labyrinth path is provided.

Here, FIG. 5a shows a treatment device 70 in the form of a labyrinth path, by means of which a flow path of the venting gas and possibly entrained particles takes place. For example, several flow walls 72, 74 are provided within the chamber bounded by the side sill 26, through which, on the one hand, a normally normal flow path within the hollow chambers of the side sill 26 is extended and, for example, through the obstacles 84 shown in FIG. 6a, possibilities are provided for collecting or separating particles within the venting gas. This labyrinth path thus achieves, on the one hand, a cooling of the venting gas and possibly entrained particles as a result of the extension of the flow path and, on the other hand, the particles entrained with the venting gas are retained, for example at the obstacles 84. The result is that, after passing through the treatment device 70, the venting gas and possibly its particles are significantly cooled or, in the case of the particles, at least substantially separated. The gas escaping from the side sill 26 or the venting channel is thus considerably less critical with regard to ignition.

In the exemplary embodiment of the treatment device 70 depicted in FIG. 5a, the flow path is designed to be meandering overall, with several flow sections running in the longitudinal direction of the side sill 26 lying one above the other in the upward direction of the motor vehicle and the openings 76, which are initially closed with rupture discs and in this case have a total of four openings, through which the venting gas is introduced into the side sill 26, being located in the region of the lowest flow section. If the venting gas is now introduced via at least one of the openings 76, it first flows to the right as far as the flow wall 74, as shown in FIG. 5a, and from there reaches the second flow section located above it, through which the venting gas flows from right to left as shown in FIG. 5a. At the end of the second flow section, the venting gas reaches the third flow section of the venting channel above it, through which the venting gas flows from left to right as shown in FIG. 5a, in the direction of or towards the outlet opening 46, through which the venting gas can be blown off to the surroundings. It is important to note that the direction of flow of the venting gas within the side sill changes several times, i.e., it goes back and forth. Overall, this creates a flow path through which the venting gas flows within the side sill 26 which is longer, preferably significantly longer, in particular several times longer than the overall length of the side sill 26. This in turn leads to increased cooling of the venting gas.

Figure 5B:
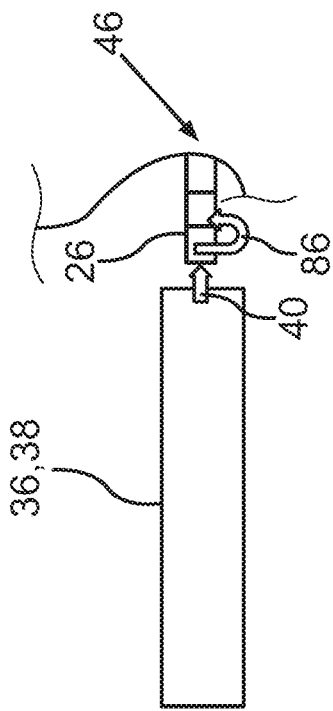

FIG. 5b schematically shows a corresponding contouring of a labyrinth path, in which venting gas is diverted accordingly (arrow 86) in a treatment device 70 in such a way that the effect described in connection with FIG. 5a is produced. This contouring of the or a labyrinth path, as will also be explained in more detail below with reference to FIGS. 6a to 6c, can be provided over the entire flow path of the venting gas within the side sill 26.

Figure 6A:
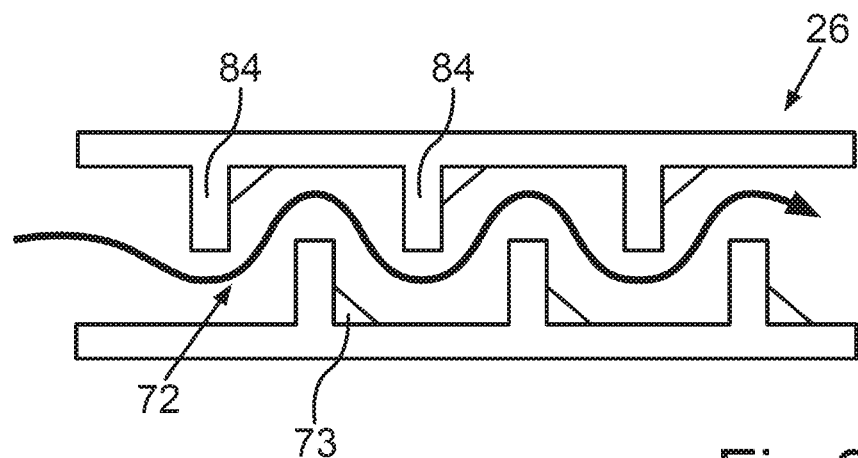
FIGS. 6a, 6b, 6c are respective schematic depictions of alternative venting gas treatment devices, FIG. 6a showing a labyrinth path, FIG. 6b showing a filter element and FIG. 6c showing an application device for the venting gas and entrained particles respectively.
Figure 6B:
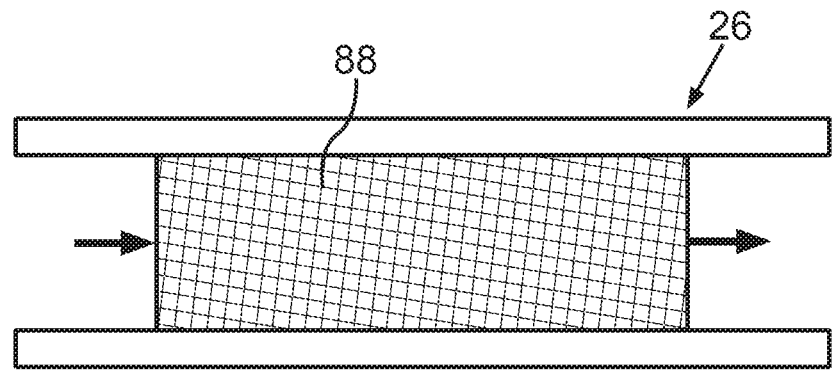
Figure 6C:
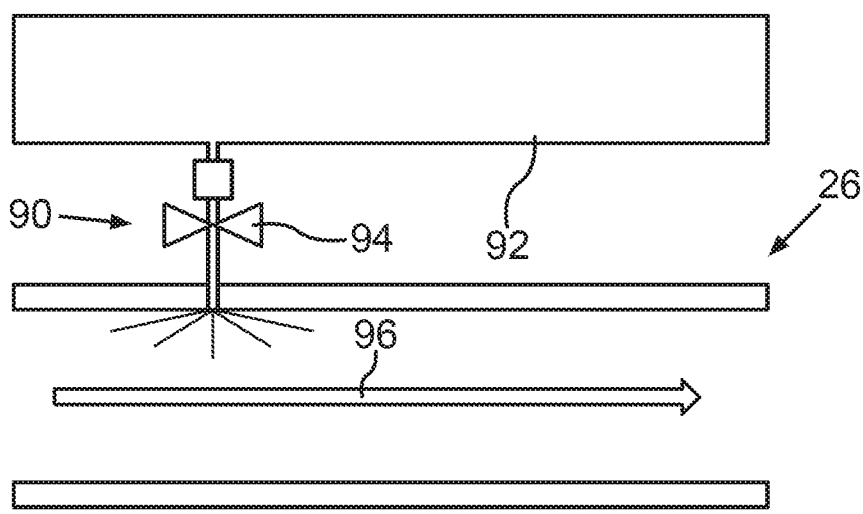

Finally, FIGS. 6a to 6c show, in a respective schematic view, respective alternative embodiments of the venting gas treatment device 70.

FIG. 6a thus shows a corresponding contouring or labyrinth path 71 in the side sill 26 to enable particle separation. In addition, the labyrinth path results in an extended flow path with the advantages already described in connection with FIGS. 5a and 5b. Particles entrained with the venting gases are again collected at respective obstacles 84.

FIG. 6b shows a venting gas treatment device 70 which comprises a filter 88 or similar filter cartridge arranged, for example, within the side sill 26. When the venting gas and the associated particles flow through the filter 88, the particles are separated or filtered out. In addition, a cooling of the venting gas may be achieved by turbulence.

Finally, FIG. 6c shows a venting gas treatment device 70 having a pressurization device 90, by means of which the venting gas and/or the particles carried along with it can be pressurized with a medium, in particular with water. For this purpose, a cooling water line 92 is visible in the present case, wherein water or the like can be injected via a controlled valve 94 into the ventilation duct or into the side sill 26 in order to cool a venting gas and associated particles indicated by an arrow 96.

The invention claimed is:

1. A bodyshell structure for an electrically driveable motor vehicle, comprising:
   a ventilation channel formed by a plurality of structural components that are connected to one another and delimit respective cavities, wherein the ventilation channel has at least one inlet opening for inflow of a venting gas that emerges from a drive battery of the motor vehicle in an event of a thermal event and has at least one outlet opening via which the venting gas is dischargeable into a surrounding of the motor vehicle; and a venting gas treatment device disposed inside the ventilation channel, wherein the venting gas and/or particles entrained with the venting gas is treatable by the venting gas treatment device;

wherein the venting gas treatment device has a contouring or labyrinth path for extending a flow path of the venting gas through the ventilation channel and/or for collecting the particles entrained with the venting gas.

2. The bodyshell structure according to claim 1, wherein the venting gas treatment device has a plurality of flow walls and a plurality of obstacles.

3. The bodyshell structure according to claim 1, wherein the plurality of structural components form a floor assembly, wherein respective battery modules are receivable in the respective cavities, and wherein the at least one inlet opening is disposed in a cross member of the plurality of structural components.

4. The bodyshell structure according to claim 1, wherein the plurality of structural components form a floor assembly, wherein respective battery modules are receivable in the respective cavities, and wherein the at least one inlet opening is disposed in a side sill of the plurality of structural components.

5. The bodyshell structure according to claim 1, wherein the plurality of structural components include cross members that are closed in a region of a central channel via respective central channel brackets.

6. The bodyshell structure according to claim 1, wherein the plurality of structural components form a floor assembly, wherein respective battery modules are receivable in the respective cavities, and wherein the floor assembly defines a space for an encapsulated area in a front area and/or a rear area of the battery modules.

7. A bodyshell structure for an electrically driveable motor vehicle, comprising:
a ventilation channel formed by a plurality of structural components that are connected to one another and delimit respective cavities, wherein the ventilation channel has at least one inlet opening for inflow of a venting gas that emerges from a drive battery of the motor vehicle in an event of a thermal event and has at least one outlet opening via which the venting gas is dischargeable into a surrounding of the motor vehicle; and
a venting gas treatment device disposed inside the ventilation channel, wherein the venting gas and/or particles entrained with the venting gas is treatable by the venting gas treatment device;
wherein the venting gas treatment device is configured to cool the venting gas and/or the particles entrained with the venting gas.

8. The bodyshell structure according to claim 7, wherein the venting gas treatment device is configured to collect the particles entrained with the venting gas.

9. A bodyshell structure for an electrically driveable motor vehicle, comprising:
a ventilation channel formed by a plurality of structural components that are connected to one another and delimit respective cavities, wherein the ventilation channel has at least one inlet opening for inflow of a venting gas that emerges from a drive battery of the motor vehicle in an event of a thermal event and has at least one outlet opening via which the venting gas is dischargeable into a surrounding of the motor vehicle; and
a venting gas treatment device disposed inside the ventilation channel, wherein the venting gas and/or particles entrained with the venting gas is treatable by the venting gas treatment device;
wherein the venting gas treatment device has an application device and wherein the venting gas and/or the particles entrained with the venting gas can be applied with a medium by the application device.

* * * * *